United States Patent [19]

McSherry et al.

[11] Patent Number: 4,752,170
[45] Date of Patent: Jun. 21, 1988

[54] FASTENING DEVICE WITH NESTING ANCHORING ELEMENTS

[75] Inventors: Thomas W. McSherry, Stamford, Conn.; Nathaniel H. Garfield, Harrison, N.Y.

[73] Assignee: Mechanical Plastics Corp., Pleasantville, N.Y.

[21] Appl. No.: 903,636

[22] Filed: Sep. 4, 1986

[51] Int. Cl.$^4$ .................. F16B 21/00; F16B 13/04
[52] U.S. Cl. .................................... 411/60; 411/340
[58] Field of Search ...................... 411/34–38, 411/55, 57, 60, 61, 340–346, 15, 82

[56] References Cited

U.S. PATENT DOCUMENTS

| 4,181,061 | 1/1980 | McSherry | 411/55 |
| 4,289,062 | 9/1981 | Schiefer | 411/340 |
| 4,462,729 | 7/1984 | Uhlig et al. | 411/15 |
| 4,518,291 | 5/1985 | Lang et al. | 411/60 |

FOREIGN PATENT DOCUMENTS

2846070  5/1980  Fed. Rep. of Germany ........ 411/57
3419923 11/1985  Fed. Rep. of Germany ........ 411/82

Primary Examiner—Neill Wilson
Attorney, Agent, or Firm—Israel Nissenbaum

[57] ABSTRACT

A multi-function integrally molded plastic fastener for insertion within a hole in a wall for fastening objects to any of solid, thick or thin hollow walls. The fastener comprises a base element and an anchoring element with the base element being positioned within the hole and depending whether the wall is solid, thick or thin hollow wall, the anchoring element is positioned totally within, partially within and totally behind the wall respectively. The anchoring element is comprised of outstretched anchoring arms which are collapsible for insertion within the hole and which arms have interfitting sections of a sinusoidal wave configuration to minimize the cross section of the anchoring element and the width required for the hole. The ends of the arms, spaced from the base element, engage an external fastening member thereby providing a solid anchorage in any of a solid, thick or thin hollow wall.

19 Claims, 3 Drawing Sheets

FASTENING DEVICE WITH NESTING ANCHORING ELEMENTS

BACKGROUND OF THE INVENTION

This invention relates to fastening devices and, more particularly, to multi-function, integrally molded, plastic fasteners which function in hollow, thick or solid support members such as walls or partitions.

Multi-function plastic expansible fasteners of the type disclosed in U.S. Pat. No. 3,651,734, issued to one of the inventors herein on Mar. 28, 1972, have attained wide-ranging commercial success throughout the world. This fastener can act as a wedge in a solid wall and also has the capability of opening, upon insertion through a hollow wall, to provide a positive blind side anchorage so that it can reliably function in this mode as well. Modifications of fasteners, as disclosed in U.S. Pat. No. 4,181,061, issued to the same inventor on Jan. 1, 1980, have tended to be more limited in their application. For example, in this latter patent, an integrally molded plastic fastener is disclosed with enhanced load bearing capability but is described as being specifically for use in hollow walls. Dowel fasteners, for example as described in U.S. Pat. Nos. 4,142,440, and 4,518,291, issued Mar. 6, 1979 and May 21, 1985 respectively, represent other types of fasteners which are exclusively for use in solid wall applications.

With the embodiments disclosed in the aforementioned patents, as well as with many other wall fasteners, a hole, of sufficient width to permit passage of the anchoring element portion of the fastener, is initially formed in a support member such as a wall. The anchoring element of the fastener is then inserted therethrough for fixed deployment of the fastener. It is highly desirable to minimize passage hole width to (in addition to aesthetic considerations) reduce any possible damage to walls, to facilitate drilling particularly in hard structures such as masonry or concrete and to reduce areal fill-ins should the fasteners be removed. Accordingly, many fastening devices, particularly those designed for utilization in hollow wall applications, are specifically designed to permit temporary folding or collapsing of the anchoring elements of the fasteners to reduce the size required for the passage hole. Attempts to actually reduce the dimension of the anchoring elements to concomitantly further reduce hole size have generally only resulted in reduction of the load bearing capability of such fasteners.

It is an object of the present invention to provide a multi-function fastening device utilizable in hollow, thick or solid walls with passage holes of reduced dimension, while having substantially equivalent or enhanced load bearing capability as compared to fasteners requiring larger passage holes.

It is a further object of the present invention to provide a multiple application high strength fastening device which is capable of being installed on an automated basis.

These and other objects, features and advantages of the present invention will become more apparent from the following discussion as well as the drawings in which:

SUMMARY OF THE INVENTION

The present invention comprises a multi-function device for supportingly fastening items to any of a hollow (the term "hollow" herein and throughout the text refers to a thin support member such as a wall, most commonly encountered as one side of a wall having a hollow section therein), thick or solid support member such as a wall, partition or the like, wherein at least a portion of the fastening device is inserted within a hole formed in the support member. The fastening device is comprised of a collapsible anchoring element connected to a base element and it is preferred that this connection be an integral one. The anchoring element should be capable of movement between a closed minimal-dimension fully collapsed position, suitable for insertion within the hole; and a fully opened anchoring position suitable for use with a thin or hollow support member, when the collapsed anchoring element passes completely beyond the hole. The position of the anchoring element relative to the support member, upon deployment of the fastening device, is dependent upon the nature of the support member. This relative position ranges from completely contained within the hole, in a solid support member, to a position wherein the anchoring element passes completely beyond the hole, in a hollow support member. In thick walls the anchoring element is in an intermediate position of being partially contained within the hole and partially extending beyond the hole. However, the base element, in all embodiments, remains fixed within the hole. In very thin hollow walls the base element, within the hole, is preferably also integrated with an outer element such as a front flange to enhance overall anchorage to a relatively flimsy support member.

In accordance with the present invention the anchoring element comprises at least two separate interfitting sections which nest with each other in achieving the closed minimal dimension position. In addition, the interfitting sections have respective ends which define means for fixed engagement with an external fastening member such as an anchoring screw, bolt, nail and the like at a point distant and spaced from the base element. With such spacing of the base element from the engagement means, the fastener is a multi-function one which can optionally operate as a solid or thick wall anchor or as an anchor in a hollow or thin wall (depending upon the distance of the spacing and wall thickness). The spacing also enhances the holding strength of the fastener in solid or thick walls in applications wherein the anchoring element does not fully open behind the wall. This results from enhanced wedging action caused by the greater angle of intersection between the interfitting sections and the walls of the hole when the vertex of the angle is at the spaced engagement point rather than at the base. Additionally, in thick walls, the greater angle further increases the mass of interfitting sections which extends directly behind the peripheral edges of the hole thereby enhancing shear strength and holding capability of the fastener therein. The enhanced holding strength is particularly evident in applications wherein the hole is slightly oversized and the angular difference is more pronounced.

The interfitting sections are comprised of protrusions and depressions from a plane normal to the surfaces of the anchoring element sections which abut each other when the anchoring element is in the closed position. Such protrusions and depressions are of a dimension and in a position relative to each other to enable the requisite nesting for achieving the closed minimal dimension. In addition, the protrusions are of an extent whereby some or all of them are capable of being compressed between the wall and an anchoring screw, bolt, pin, nail or the like when the fastener is deployed in a solid or thick wall and the anchoring element is not fully opened. As a result of such compressive forces, load bearing strength is enhanced in such applications.

Expansion type anchors for insertion into a hole in solid material of the type disclosed in Fed. Rep. Ger. Pat. No. 673,035, issued Mar. 15, 1939, and expansion dowels of the type disclosed in the aforementioned U.S. Pat. Nos. 4,142,440 and 4,518,291, utilize zig-zag or wave crest configurations on the inner surfaces thereof for contact with an inserted elongated fastener, such as a screw, thereby facilitating expansion of the anchor against the inner surface of the hole. However, because of their specific application (exclusively expansion anchors in solid materials) all of the embodiments shown in these patents have their expansion members, of necessity, attached through the base member at the position where an anchoring screw is engaged. These expansion type anchors are accordingly of little or no utility in applications requiring fastening to hollow walls. In addition, the zig-zag formation of the anchor shown in the German Patent is specifically required to increase in height and depth towards the end of the anchor in order to facilitate screw contact with the entire expansion member. Such increase in zig-zag height and depth, while suitable for an expansion anchor exclusively for use in solid wall type applications, is however unsuitable for an anchor used with hollow walls because of weakening of load bearing sections of the anchor resulting from excessive thinning.

The protrusions and depressions of the interfitting sections may be in the form of a sinusoidal wave, with crests and troughs, or other similar alternating configuration. It is further preferred that the interfitting sections each be configured with at least two sets of laterally adjacent successive wave crests and troughs which extend in a direction aligned with the length of the hole when the anchoring element is in the closed minimal dimension position. In such embodiment the wave crests and troughs are staggered with respect to each other so that the crests of one set are aligned transversely with the troughs of the other set on the respective interfitting sections so that, when they are folded together, substantially all of the crests and troughs interfit with each other to form a mass of substantially solid material. By providing the interfitting sections with at least two sets of staggered troughs and crests, load bearing capability (in applications with hollow or thick walls) is enhanced by the elimination of excessively weakening full width troughs. The thickness of the interfitting sections at the base of the troughs should not however be less than about half the original thickness in order to avoid excessive weakening of the anchoring element and buckling under heavy load. Changes in trough depth and dimension should be mirrored in dimensional changes of the crest which nests therewith. For aesthetic reasons as well as uniformity in molding it is preferred that the troughs and crests respectively all be of uniform dimension.

In order to further obviate the loss of load bearing capability engendered by the troughs, reinforcing means may be utilized. A preferred embodiment of reinforcing means is a stiffening spacing rib longitudinally positioned between the respective laterally adjacent sets of troughs and crests. This stiffening rib (preferably integral with the material of the interfitting section) extends vertically from at least the lowest level of the troughs to a height of no more than about half the thickness of the interfitting section (a greater height would impede nesting of the troughs and crests into the requisite closed minimal dimension position). With the folding together of the troughs and crests, and a stiffening rib of maximum height, there is a hairline juncture between the adjacent rib sections which serves to guide an inserted fastening member between the adjacent troughs and crests. A substantially solid material front is otherwise presented to the inserted fastening member for maximum wedging and concomitant holding strength in relatively compressible materials such as polypropylene. However, relatively non-compressible materials, such as nylon, generally require a spacing between the adjacent sections of the rib in order to permit a screw to be inserted. In such materials the bite of screw threads into the relatively hard material provides holding strength.

It is further preferred that the crests be slightly inwardly biased at their upper peripheries whereby there is a frictional engagement between the crests and the adjacent section of the rib when the interfitting sections are nested. As a result of the frictional engagement, the interfitting sections are self-retained in the closed minimal dimension position whereby fasteners can be dispensed on an automated basis by guns or other tools such as those utilized with rivers. This is in contrast to other fastening devices, particularly such as those in U.S. Pat. Nos. 3,651,734 and 4,181,061, wherein manual manipulation is required to hold the anchoring element in a minimal dimension position for insertion within the support member passage hole. The frictional engagement should however be readily capable of disengagement upon deployment of means for separating the interfitting sections such as a screw, bolt, nail, pin etc. This self-retaining engaging feature is also possible with a similar frictional engagement between closely juxtaposedly adjacent crests in embodiments of the present invention wherein the spacing rib is not utilized.

In a most preferred embodiment of the present invention, the fastener is comprised of an integrally molded plastic fastener comprised of a socket base element, having a bore for receiving an elongated external fastening member. The base element is integrally joined at one of its ends to pillar-like webs which extend outwardly away therefrom and merge with an anchoring element in the form of a pair of outstretched toggle arms. The ends of the toggle arms converge toward each other, at a position overlying an inner space in the fastening device, whereby they can be folded together to form a collapsed anchoring element of the fastener which is insertable into an opening within a hollow wall or solid material. The surface of the toggle arms which face away from the socket base portion in the outstretched position and which converge toward each other upon collapse of the anchoring element of the fastener are each configured in two sets of successive wave crests and troughs. These crests and troughs extend in a direction generally parallel to the length of the toggle arms and are staggered with respect to each other so that the crests of one set are aligned transversely with the troughs of the other set across the width of the toggle arm. They are thus positioned in a keyed relationship so that, when the toggle arms are folded together, substantially all of the crests and troughs on both toggle arms interfit with each other to form a mass of substantially solid material having a minimal cross section. Upon insertion of this fastener into an opening in a thick or solid wall or the like, an elongated fastening element, such as a screw, nail, bolt or pin is inserted through the bore in the socket base element into engagement with the ends of the toggle arms at a point spaced from the base element and thereafter into compressive engagement with some or all of the interfitted wave crests and troughs of the folded toggle arms. In these applications, the interfitting wave crests are compressed by an inserted fastening member, such as a screw, and the toggle arms are therefore able to expand to a greater angle from the longitudinal axis of the fastening member than if such arms would have been base connected. This greater angle of expansion results in enhanced holding capability because of increased compression between the fastener and the walls of the hole. Additionally, in thick wall applications, when the anchoring elements cannot separate entirely, there is enhanced load bearing capability resulting from a greater mass of anchoring material behind the hole with concomitant increased shear strength.

After insertion of the fastener into an opening in a hollow wall or the like, of a thickness approximately the same as or less than the length of the socket base element and pillar-like webs, an elongated fastening member is inserted through the bore. The fastening member thereafter engages the inner ends of the toggle arms, thereby assisting them in completely unfolding and returning to their outstretched position. The toggle arms become locked thereby behnd the inaccessible interior surface of the wall. In this manner of utilization the fastening member does not however engage the toggle arm crests.

DETAILED DESCRIPTION OF THE DRAWINGS

Figures 1, 3:
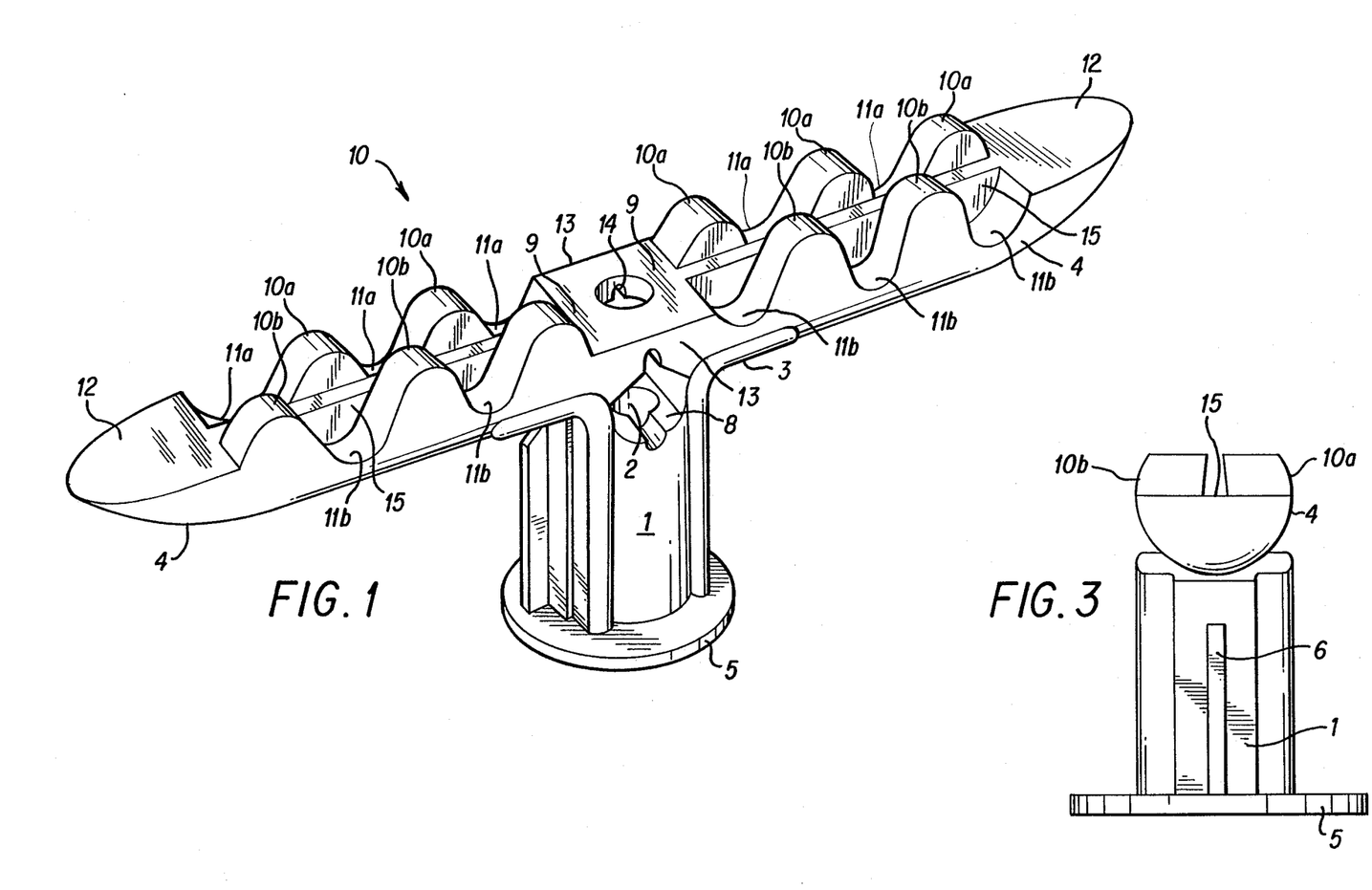
FIG. 1 is a perspective view of a fastening device in accordance with the invention showing the device as molded, with the anchoring elements in the open anchoring position.
FIG. 3 is an end view of the fastening device in FIG. 2 taken along line 3—3.
Figure 2:
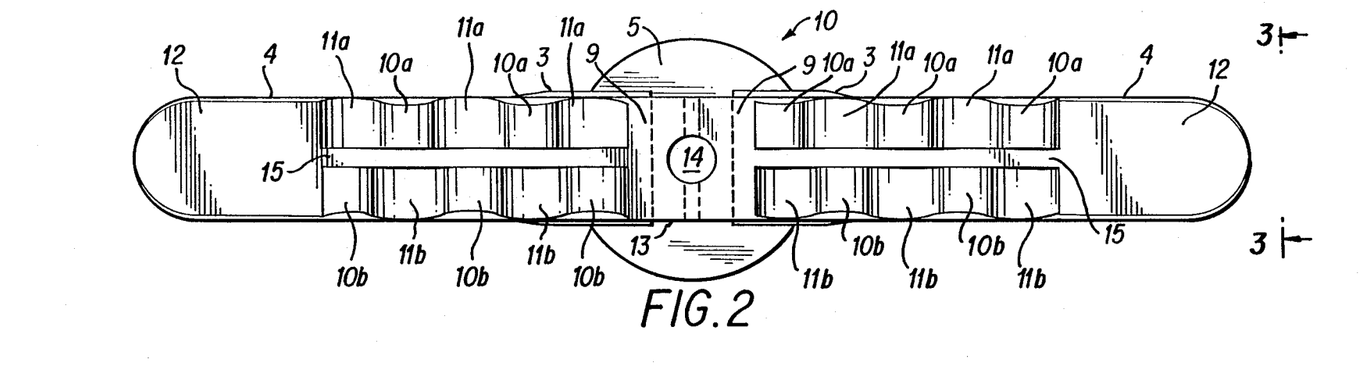
FIG. 2 is a top view of the fastening device of FIG. 1.
Figure 4:
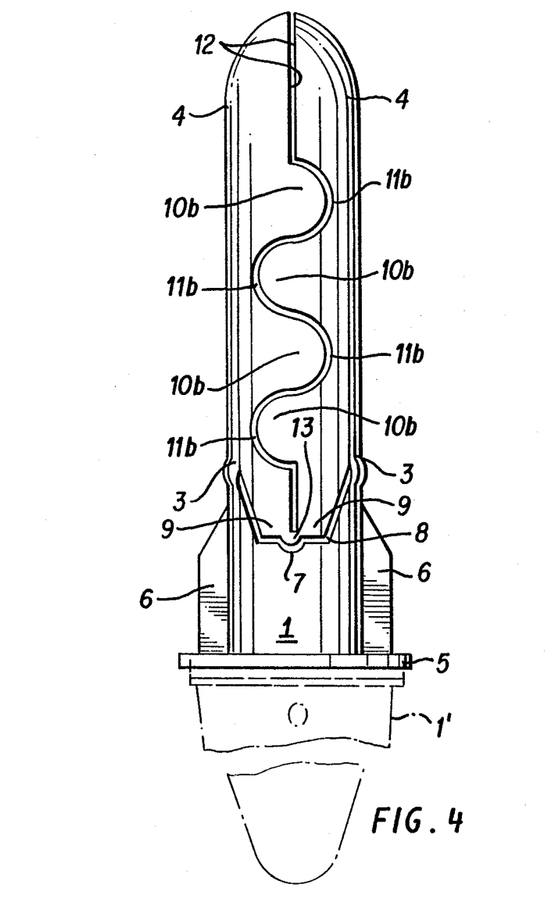
FIG. 4 is a front view of the fastening device in FIGS. 1–3 in the folded or collapsed self-holding minimal dimension position with an example of an alternative integral fastening means shown in phantom.
Figure 5:
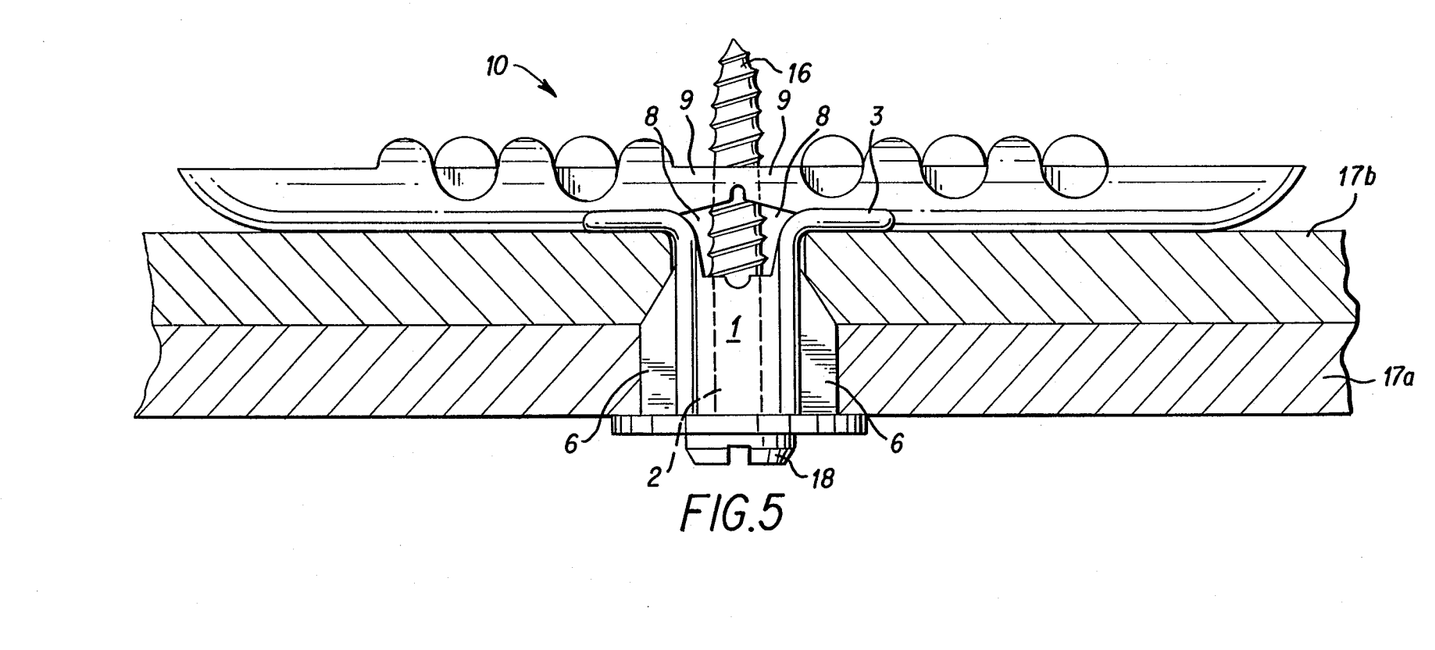
FIG. 5 is a schematic plan view of the fastening device in FIGS. 1–4 illustrating its use in a hollow wall as shown in cross section.
Figure 6:
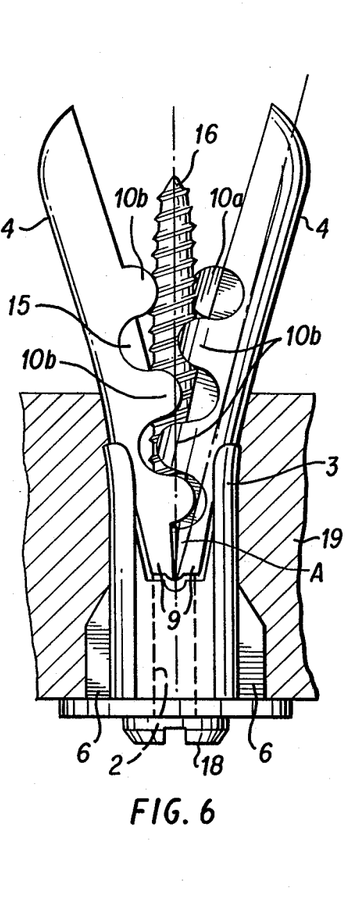
FIG. 6 is a schematic plan view of the fastening device in FIGS. 1–4 illustrating its use in a thick wall as shown in cross section.
Figure 7:
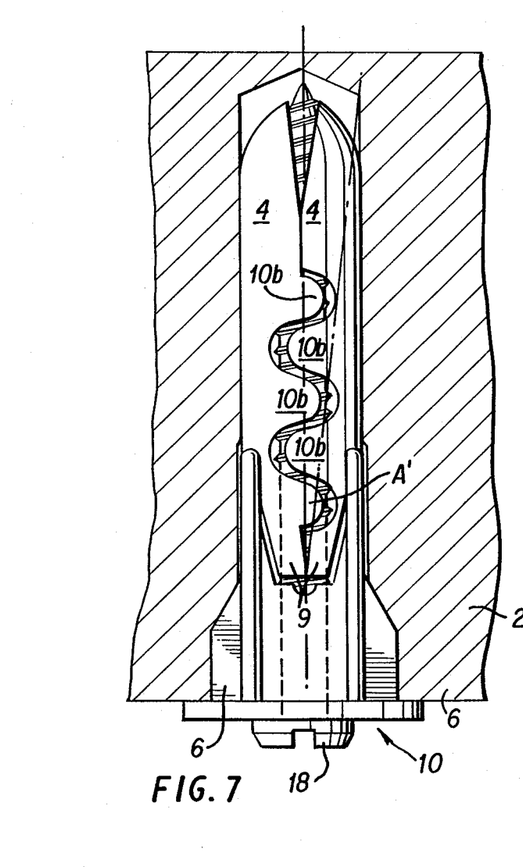
FIG. 7 is a schematic side view of the fastening device in FIGS. 1–4 illustrating its use in a solid wall as shown in cross section.

With specific reference to the drawings, the fastening device 10 of FIGS. 1 through 7 comprises a base socket element 1 having a bore 2 for receiving an elongated fastening member 16 (shown in FIGS. 5-7). The bore is preferably dimensioned for threading by a self tapping fastening member such as a screw. Base socket element 1 is preferably generally rounded and is integrally joined to pillar-like webs 3. The webs, in turn extend outwardly away from the axis of the base socket element 1 and merge with a pair of outstretched toggle arms 4. The base socket element is also preferably fitted at the end thereof opposite the toggle arms 4, with a flange 5 which becomes seated against the exterior wall surface when the fastener is installed in an opening in a solid or hollow wall or the like. This flange is preferably dimensioned to have a cross-sectional area approximately 75% greater than the cross-sectional area of the base socket element 1. The exterior of the base socket element is also fitted with antirotational fins 6 which engage the wall material and prevent rotation of the fastener in such opening during installation. The outer edges of the webs 3 preferably project out away from the exterior surface of the base socket member 1 to act as reinforcing elements and additional antirotation elements, as shown in FIG. 2.

Inner ends 9 of the toggle arms 4 are separated and spaced from base socket member 1, with the inner ends, together with the pillar like webs 3 and the surface of the base socket element 1, closest to the toggle arms, peripherally defining inner space 8. The inner space 8 is suitably dimensioned so that when the toggle arms 4 are folded together for insertion into an opening, the pillar-like webs 3 flex resiliently inwardly toward the axis of the base socket element 1, and the inner ends 9 of the toggle arms 4 pivot down into the inner space, as shown in FIG. 4. Groove 7, at the end of the base socket element, is oriented to accommodate the material of the hinge-like connection 13 after such material has pivoted down into the inner space 8 upon the folding together of the toggle arms 4 and the collapse of the fastener, as shown in FIG. 4.

FIGS. 1–3 and 5 show the toggle arms 4 in their molded, outstretched condition. The surfaces of the toggle arms 4 facing away from the base socket element 1 are each configured in two sets (a and b) of successive wave crests 10a and 10b and troughs 11a and 11b which extend in direction parallel to the lengths of the toggle arms 4. The sets of wave crests and troughs are staggered with respect to each other so that the wave crests 10a are aligned transversely on each toggle arm with the troughs 11b, and the crests 10b being similarly transversely aligned with the troughs 11a, across the width of the toggle arm. The wave crests and troughs on each toggle arm 4 are thus positioned in a keyed relationship with the troughs and wave crests on the other toggle arm so that, when the toggle arms are folded together, as shown in FIG. 4, the crests 10a of each toggle arm interfit with the troughs 11a of the other toggle arm, and the crests 10b of each toggle arm interfit with the troughs 11b of the other toggle arm. An anchoring element of minimal cross section is formed thereby. The outer tip elements of the surfaces having the crests and troughs are configured as flat surfaces 12 which abut each other when the toggle arms are completely folded to facilitate complete and even folding together of the toggle arms.

The inner ends 9 of the toggle arms 4 are preferably joined together by a hinge-like connection 13 of sufficiently reduced thickness to permit flexing thereof and pivoting of the inner ends 9 of the toggle arms 4 down into the inner space 8 as the toggle arms are folded together. The hinge-like connection 13 is provided with a hole 14 coaxially aligned with the bore 2 of the base element 1, to facilitate passage of an elongated fastening member therethrough. The periphery of hole 14 engages the fastening member whereby the toggle arms 4 are locked into a fully extended beam position as shown in FIG. 5. In thick walls as shown in FIG. 6 and solid walls as shown in FIG. 7 the locking engagement between the fastening member and the toggle arms 4 is apportioned, to varying extents, between the fastening member and both the periphery of hole 14 and the crest portions 10a and 10b. As a result, a strong load bearing configuration is formed in all positions. Though a hinge-like configuration is shown, with a hole provided therein for engagement with the fastening element, a similar locking engagement is possible with the inner ends 9 being separated but closely juxtaposed whereby such ends define an area for engagement with a fastening element inserted therebetween.

The fastening device 10 has a central stiffening rib 15 formed, on each of the toggle arms 4, by transversely spacing apart the sets of wave crests and troughs on each toggle arm, as seen in FIGS. 2 and 3. This rib provides strengthening of the toggle arms 4 for utilization in hollow or thick walls to compensate for weakening caused by the formation of the troughs. In addition, the upper peripheries of the sets of crests 10a and 10b which are slightly inwardly inclined toward each other, as seen in FIG. 3, frictionally engage the adjacent wall of the stiffening rib when the toggle arms 4 are juxtaposed, for insertion into a hole into the minimal dimension configuration. This frictional engagement maintains the fastening device 10 in the minimal dimension configuration as shown in FIG. 4 until the toggle arms 4 are separated when desired. As a result, fastening device 10 is suitable for automatic insertion with a dispensing mechanism such as a gun. Optionally the fastening device may be inserted and the toggle arms separated (when used in hollow or thick walls) during a single dispensing procedure.

The central rib 15 serves the additional purpose of providing a narrow guide for the insertion of the elongated fastening element 16. Thus, after the elongated fastening member, passes through the bore 2 and the hole 14, it is thereby centrally oriented between the sets of wave crests 10a and 10b. Additionally, except for the narrow fissure between the juxtaposed portions of rib 15, a substantially solid material front is presented to an advancing screw whereby maximum wedging action is achieved by displacement of the plastic material of the rib portions.

The surfaces of the toggle arms 4, opposite the surfaces configured with the crests and troughs, are preferably curved so that when the toggle arms 4 are folded together, for insertion into an opening, a partially cylindrical exterior is formed, for a snug fit within the opening of substantially equal diameter. This snug fit increases the wedging action of the fastener when installed in conjunction with an elongated fastening member 16 within an opening in a solid or thick wall or the like.

The toggle arms 4, when folding and unfolding, i.e., when moving from the expanded condition of FIGS. 1 and 3 to the collapse condition of FIG. 4, preferably go through a toggling motion whereby the toggle arms, once folded and disturbed from their 180° molded outstretched condition, are maintained in stable relatively folded and relatively unfolded positions on opposite sides of the unstable focal point of the toggling motion. This is achieved by molding the inner ends 9 of the toggle area 4 to such a dimension that, upon the pivoting of the toggle arms, a springing action is applied by the resilient webs 3 through the inner ends 9 and to the fulcrum of the pivoting toggle arms at the hinge-like connection 13. With closely juxtaposed but separated ends a key or fastening member serves to move the toggle arms from the collapse to expanded position.

The fastener 10 of the present invention may have external holding means integrated with base element 1 as shown in phantom in FIG. 4. Such holding means may be in the form of a strap 1' as shown and as more fully described in commonly assigned copending application Ser. No. 663,613 filed Oct. 22, 1984. Other holding means described in said copending application include hooks, rings, cylinders and the like.

FIGS. 5–7 show the fastener 10 installed in walls 17a & b, 19 and 20, respectively, of various thicknesses. The fastener is locked into position by elongated threaded screw 16 which is at least approximately equal in length to the entire length of the fastener. In each of the applications depicted in FIGS. 5–7 the fastener is initially collapsed for insertion in the holes by the folding together of the toggle arms 4, as shown in FIG. 4. After insertion the antirotation fins 6 become embedded in the material of the walls and screw 16 is inserted into the fastening device until the head 18 thereof becomes flush with the flange 5.

FIG. 5 shows the fastener installed in a bi-layered wall approximately equal to the length of the base socket element 1 and pillar-like webs 3. Screw 16, having passed through the bore 2 engages the inner ends 9 of the toggle arms 4, and pushes them, at the hinge-like connection 13, out of the inner space 8 and through their toggling motion to an unfolded, outstretched locked position. In this position the fastener, is securely held in the opening by the action of the screw 16 pressing against the inner ends 9 which, in turn, causes the rigid toggle arms 4 to press back against the interior surface of the thin or hollow wall. The fastener is thus securely locked in place and the screw 16 is thereby securely held within the opening. Any fixture which is desired to be attached to the wall is in turn securely sandwiched between the screw head 18 and the flange 5. In addition, the two wall layers 17a and 17b are also firmly compressively held together by the fastener.

FIG. 6 shows the fastener installed in a wall 19 of thickness greater than the length of the base socket element 1 and pillar-like webs 3, but not of a thickness as great as the entire length of the fastener. In this mode of utilization, the screw 16, passes through the bore 2 and hole 14 into engagement with the interface between adjacent rib portions 15 and wave crests 10a and 10b. This in turn causes the outer curved surfaces of the toggle arms 4 to be securely wedged against the inner surface of the hole in lateral directions away from the axis of the screw, and the portions of the toggle arms extending behind the wall to expand beyond the edges of the opening. Angle A, between the toggle arms and the screw axis, having a vertex at the juncture of toggle arm ends 9, defines the degree to which the toggle arms expand against and behind the wall with a greater angle providing enhanced wedging and shear strength and thus greater load bearing capability. In this regard it should be noted that in prior art applications, as exemplified by the aforementioned German Patent, the wedging and holding strength is dependent on an angle with a vertex at the point of engagement between the screw and the base element which is more acute relative to the screw axis, with a concomitant lesser degree of wedging and load bearing strength.

FIG. 7 shows the fastener installed in a solid wall 20 having a drilled opening of a depth slightly greater than the length of the fastening device. The load bearing capability of the fastening device, in this position, is entirely due to the action of the screw 16 upon the wave crests 10a and 10b and the arms 4, which causes the curved outer surfaces of the toggle arms to be firmly wedged against the inner surface of the opening in radial directions away from the axis of the fastener. In such mode of utilization as well, the angle A' between the wedged arms 4 and the screw axis has a vertex at the juncture of toggle arm ends 9 and is thus greater than the wedging angle of prior art fasteners having a vertex at the point of engagement between a screw and the base element.

A fastener as disclosed herein, comprised of injection molded polypropylene possesses the preferred degree of toughness and resiliency for its usual intended applications. Other thermoplastic materials having predetermined strength and flexibility properties sufficient for specific intended applications may also by used. The insertion of metal reinforcing elements into portions of the base socket element 1 and/or toggle arms 4 provides greater strength for heavier load applications. The molded fastener can also be made to include metal surfaces to be electrically conductive for use in electrical applications.

The device is preferably formed of a molded flexible plastic material such as polypropylene. Other less flexible but stronger materials such as nylon may be utilized with modifications such as described above. Optionally, the base element may be integrally molded with an external fastening member which holds or supports objects against the support member.

It is understood that the fastener described above and illustrated in the drawings is illustrative of the present invention and is not to be construed as a limitation on the present invention. For example, though the fastener is comprised of two toggle arms, additional toggle arms may be utilized with a similar type of nesting for achieving the requisite minimal dimensions for hole insertion. These and other changes and modifications may be made without departing from the scope of the present invention as defined in the following claims.

We claim:

1. A multi-function device for fastening items to any of a hollow, thick or solid support member, wherein at least a portion of the fastening device is inserted within a hole formed in the support member, said fastening device being comprised of an anchoring element connected to a base element having a longitudinal axis, with said anchoring element being capable of movement between a closed minimal dimension position, for insertion within said hole, and a fully opened anchoring position, suitable for use with a hollow support member, wherein said anchoring element passes completely beyond said hole; with said insertion situating said base element within said hole, wherein said longitudinal axis of said base element is in line with the walls of said hole, and said anchoring element is situated into a position, from completely contained within said hole in a solid support member, to a position wherein said anchoring element passes completely beyond said hole in a hollow support member; characterized in that said anchoring element comprises at least two separate interfitting sections thereof which nest with each other in achieving said closed minimal dimension position, and wherein said interfitting sections have respective ends which define means for engagement with an external fastening member at a point distant and spaced from the base element, wherein the respective ends of said interfitting sections have peripherally adjacent edges which are juxtaposed and closely spaced, with said peripherally adjacent edges extending in a direction transverse to said longitudinal axis of said base element, and said adjacent edges providing said means for engagement with an external fastening member, with said edges being adapted and positioned to engage the external fastening member therebetween.

2. The fastening device of claim 1 wherein said interfitting sections comprise protrusions and depressions from a plane normal to the surfaces of said sections which about each other when the anchoring element is in the closed minimal dimension position, with said protrusions and depressions being of a dimension and in a position relative to each other to enable the requisite nesting for achieving the closed minimal dimension position.

3. The fastening device of claim 2 wherein said fastener is comprised of a molded plastic material and said protrusions and depressions comprise crests and troughs respectively which are successively situated in a sinusoidal wave configuration.

4. The fastening device of claim 3 wherein the sinusoidal wave configuration on each of said interfitting sections terminates, at a portion of said interfitting section intially closest to said hole during the insertion, in a substantially flat section normal to the surface of said interfitting section.

5. The fastening device of claim 1 wherein the respective ends of said interfitting sections are hingedly attached, with an aperture at said point of attachment, and with the peripheral edge of said aperture comprising said peripherally adjacent edges which provide said means for engagement with an external fastening member.

6. The fastening device of claim 3 wherein said interfitting sections are each configured with at least two laterally adjacent sets of successive wave crests and troughs which extend in a direction aligned with the length of the hole when the anchoring element is in the closed minimal dimension position and wherein the wave crests and troughs of each of said sets are staggered with respect to the wave crests and troughs of another of said sets whereby the crests of one set are aligned transversely with the troughs of the other set on the respective interfitting sections so that, when the interfitting sections are nested together, substantially all of the crests and troughs interfit with each other to achieve said minimal dimension position and thereby forming a mass of substantially solid material.

7. The fastening device of claim 6 wherein each of said interfitting sections further comprises reinforcing means.

8. The fastening device of claim 6 wherein said anchoring element further comprises means for retention of said interfitting sections in said closed minimal dimension position.

9. The fastening device of claim 6 wherein means for externally holding objects against said support member is integrally molded with said base element.

10. A fastener to be secured in an opening within a support member which comprises:
   (a) a base socket portion integrally joined to a pair of outstretched arms, with said arms having ends with peripheral edges proximal to each other at a position distant from said socket;
   (b) at least portions of the surfaces of said arms facing away from the socket being configured in successive crests and troughs extending in wave-like manner in directions generally parallel to the lengths of the toggle arms;

(i) the crests and troughs on each toggle arm also being divided into two sets which are staggered with respect to each other such that the crests of one set are aligned transversely with the troughs of the other set across the width of the toggle arm;

(ii) the two sets on both toggle arms also being positioned in keyed relationship such that when the toggle arms are folded together substantially all of the crests and troughs on both toggle arms interfit with each other to form a mass of substantially solid material;

(c) the base socket portion having a bore, extending along the longitudinal axis thereof, for receiving an elongated fastening member, whereby upon folding of the toggle arms together, the fastener may be inserted into an opening;

A. in a solid wall or the like to present maximum solid material in the pathway of an elongated fastening member entering the socket bore and thereafter the inner space and the interfitted crests and troughs of the folded arms, thereby achieving maximum wedging action within such opening as the fastening member penetrates into the solid material; or B. in a hollow wall or the like of a thickness approximately the same as the length of the socket portion and the pillar-like webs, to enable an elongated fastening member to pass through the bore and then engage said edges of the toggle arms and thereby assist the toggle arms to unfold and return toward their outstretched position, and further to cause such unfolded toggle arms to become locked in the outstretched position with said edges engaging said fastening member, and extending in a direction transverse to said longitudinal axis of said base socket portion.

11. A multi-function device for fastening items to any of a hollow, thick or solid support member wherein at least a portion of the fastening device is inserted within a hole formed in the support member, said fastening device being comprised of a molded plastic material and comprising an anchoring element connected to a base element, with said anchoring element being capable of movement between a closed minimal dimension position, for insertion within said hole, and a fully opened anchoring position, suitable for use with a hollow support member, wherein said anchoring element passes completely beyond said hole; with said insertion situating said base element within said hole and said anchoring element into a position, from completely contained within said hole, in a solid support member, to a position wherein said anchoring element passes completely beyond said hole, in a hollow support member; characterized in that said anchoring element comprises at least two separate interfitting sections thereof which nest with each other in achieving said closed minimal dimension position, wherein said interfitting sections have respective ends which define means for engagement with an external fastening member at a point distant and spaced from the base element, and wherein said interfitting sections comprise protrusions and depressions from a plane normal to the surfaces of said sections, which abut each other when the anchoring element is in the closed minimal dimension position, with said protrusions and depressions comprising crests and troughs respectively being of a dimension and in a position relative to each other to enable the requisite nesting for achieving the closed minimal dimension position and wherein said interfitting sections are each configured with at least two laterally adjacent sets of said crests and troughs which extend in a direction aligned with the length of the hole when the anchoring element is in the closed minimal dimension position and wherein the crests of one set are aligned transversely with the troughs of the other set on the respective interfitting sections so that, when the interfitting sections are nested together, substantially all of the crests and troughs interfit with each other to achieve said minimal dimension position, thereby forming a mass of substantially solid material and wherein each of said interfitting sections further comprises reinforcing means comprising a stiffening spacing rib longitudinally positioned between the adjacent sets of crests and troughs on each of said interfitting sections.

12. A device for fastening items to a support member wherein the fastening device is inserted within a hole formed in the support member, said fastening device being comprised of a molded plastic material and comprising an anchoring element connected to a base element, characterized in that said anchoring element comprises at least two separate interfitting sections thereof which nest with each other in achieving a closed minimal dimension position, wherein said interfitting sections comprise protrusions and depressions from a plane normal to the surfaces of said sections, which abut each other when the anchoring element is in the closed minimal dimension position, with said protrusions and depressions comprising crests and troughs respectively which are successively situated in a sinuosodal wave configuration and being of a dimension and in a position relative to each other to enable the requisite nesting for achieving the closed minimal dimension position and wherein said interfitting sections are each configured with at least two laterally adjacent sets of successive wave crests and troughs which extend in a direction aligned with the length of the hole when the anchoring element is in the closed minimal dimension position and wherein the wave crests and troughs of each of said sets are staggered with respect to the wave crests and troughs of another of said sets whereby the crests of one set are aligned transversely with the troughs of the other set on the respective interfitting sections so that, when the interfitting sections are nested together, substantially all of the crests and troughs interfit with each other to achieve said minimal dimension position, thereby forming a mass of substantially solid material and wherein each of said interfitting sections further comprises reinforcing means comprising a stiffening spacing rib longitudinally positioned between the adjacent sets of wave crests and troughs on each of said interfitting sections.

13. A multi-function device for fastening items to any of a hollow, thick or solid support member wherein at least a portion of the fastening device is inserted within a hole formed in the support member, said fastening device being comprised of a molded plastic material and comprising an anchoring element connected to a base element, with said anchoring element being capable of movement between a closed minimal dimension position, for insertion within said hole, and a fully opened anchoring position, suitable for use with a hollow support member, wherein said anchoring element passes completely beyond said hole; with said insertion situating said base element within said hole and said anchoring element into a position, from completely contained within said hole, in a solid support member, to a position wherein said anchoring element passes completely beyond said hole, in a hollow support member; characterized in that said anchoring element comprises at least two separate interfitting sections thereof which nest with each other in achieving said closed minimal dimension position, wherein said interfitting sections have respective ends which define means for engagement with an external fastening member at a point distant and spaced from the base element, and wherein said interfitting sections comprise protrusions and depressions from a plane normal to the surfaces of said sections, which abut each other when the anchoring element is in the closed minimal dimension position, with said protrusions and depressions comprising crests and troughs respectively which are successively situated in a sinusoidal wave configuration and being of a dimension and in a position relative to each other to enable the requisite nesting for achieving the closed minimal dimension position and wherein said interfitting sections are each configured with at least two laterally adjacent sets of successive wave crests and troughs which extend in a direction aligned with the length of the hole when the anchoring element is in the closed minimal dimension position and wherein the wave crests and troughs of each of said sets are staggered with respect to the wave crests and troughs of another of said sets whereby the crests of one set are aligned transversely with the troughs of the other set on the respective interfitting sections so that, when the interfitting sections are nested together, substantially all of the crest and troughs interfit with each other to achieve said minimal dimension position, thereby forming a mass of substantially solid material and wherein each of said interfitting sections further comprises reinforcing means comprising a stiffening spacing rib longitudinally positioned between the adjacent sets of wave crests and troughs on each of said interfitting sections.

14. The fastening device of claim 13 wherein said stiffening rib is integral with the material of the interfitting section and extends vetically from at least the lowest level of the troughs to a height of no more than about half the thickness of the interfitting section.

15. The fastening device of claim 14 wherein said stiffening rib on each of said interfitting sections extends vertically from at least the lowest level of the troughs to a height of about half the thickness of the interfitting section whereby when said anchoring element is in said closed minimal dimension position, the ribs of the abutted interfitting sections are closely juxtaposed with a hairline juncture therebetween.

16. The fastening device of claim 15 wherein said fastening device is comprised of polypropylene.

17. The fastening device of claim 14 wherein said stiffening rib on each of said interfitting sections extends vertically from at least the lowest level of the troughs to a height of less than half the thickness of the interfitting section whereby when said anchoring element is in said closed minimal dimension position, the ribs of the abutted interfitting sections are closely juxtaposed with a spacing therebetween sufficient to allow insertion of said fastening member therethrough.

18. The fastening device of claim 17 wherein said fastening device is comprised of nylon.

19. The fastening device of claim 13 wherein said crests are slightly inwardly biased at their upper peripheries whereby there is a frictional engagement between the crests and the adjacent section of the rib when the interfitting sections are nested with the interfitting sections being thereby self-retained in the closed minimal dimension and whereby the frictional engagement is readily capable of disengagement upon deployment of means for separating the interfitting sections.

* * * * *